United States Patent
Ngai (10) Patent No.: US 7,922,170 B2
(45) Date of Patent: Apr. 12, 2011

(54) SHEET TYPE HANDLING APPARATUS

(75) Inventor: Kam Sing Ngai, Singapore (SG)

(73) Assignee: Seiko Epson Corporation, Tokyo (JP)

( * ) Notice: Subject to any disclaimer, the term of this patent is extended or adjusted under 35 U.S.C. 154(b) by 75 days.

(21) Appl. No.: 12/403,467

(22) Filed: Mar. 13, 2009

(65) Prior Publication Data

US 2009/0230611 A1 Sep. 17, 2009

(30) Foreign Application Priority Data

Mar. 14, 2008 (JP) ................... 2008-065322

(51) Int. Cl.
*B65H 1/00* (2006.01)
(52) U.S. Cl. ...................................... 271/162
(58) Field of Classification Search .............. 271/162, 271/163; 232/44; 109/68
See application file for complete search history.

(56) References Cited

U.S. PATENT DOCUMENTS

| 5,454,555 | A  | * | 10/1995 | Kiyohara et al. | 271/9.01 |
| 6,830,401 | B1 | * | 12/2004 | Hwang et al.    | 400/693  |
| 6,899,422 | B2 | * |  5/2005 | Strowe et al.   | 347/108  |

FOREIGN PATENT DOCUMENTS

| JP | 04-269572   | 9/1992  |
| JP | 05-077507   | 3/1993  |
| JP | 11-239249   | 8/1999  |
| JP | 2002-265101 | 9/2002  |
| JP | 2004-345247 | 12/2004 |

* cited by examiner

*Primary Examiner* — Stefanos Karmis
*Assistant Examiner* — Michael C McCullough
(74) *Attorney, Agent, or Firm* — Workman Nydegger (57) ABSTRACT

A sheet type handling apparatus which handles various sheets includes an apparatus body having an introduction port for introducing the sheets; a first lid member rotatably attached to the apparatus body for supporting the sheets introduced into the introduction port; and a second lid member connected to the first lid member for covering the introduction port in association with an action to close the first lid member.

5 Claims, 7 Drawing Sheets

SHEET TYPE HANDLING APPARATUS

The entire disclosure of Japanese Patent Application No. 2008-065322, filed Mar. 14, 2008 is expressly incorporated by reference herein.

BACKGROUND

1. Technical Field

The present invention relates to a sheet type handling apparatus.

2. Related Art

In the related art, a sheet type handling apparatus such as an image scanner, a copying machine, and so on, having a sheet feed function for handling various sheets such as original documents for scanning images or papers for printing images is known (JP-A-11-239249). Among the sheet type handling apparatuses as described above, the one having a rotatably mounted tray for supporting sheets introduced into the apparatus for the convenience for storing the apparatus is known.

However, the tray is required to have a plane surface for supporting the sheets to be introduced into the sheet type handling apparatus, and the sheet type handling apparatus using the tray as a lid member might be limited in shape.

SUMMARY

An advantage of some aspects of the invention is to reduce the limitation on the shape of a sheet type handling apparatus having a tray for supporting sheets.

In order to solve at least part of the above described problem, the invention employs the following modes.

According to a first aspect of the invention, a sheet type handling apparatus which handles various sheets will be described. The sheet type handling apparatus includes an apparatus body having an introduction port for introducing the sheets; a first lid member rotatably attached to the apparatus body for supporting the sheets introduced into the introduction port; and a second lid member connected to the first lid member for covering the introduction port in association with an action to close the first lid member.

In this configuration, since the introduction port is covered by the second lid member, the limitation on the shape of the apparatus body is alleviated.

Preferably, the second lid member may be fixed to the apparatus body when the first lid member is closed. In this case, the second lid member is fixed to the apparatus body in a state in which the introduction port is covered.

Preferably, the apparatus body includes a first engaging portion, and the second lid member includes a second engaging portion which engages the first engaging portion when the first lid member is closed. In this case, the second lid member is fixed to the apparatus body by the engagement between the first engaging portion and the second engaging portion.

Preferably, the first lid member includes leg portion attached at distal end thereof to the apparatus body; a first proximal portion to which a proximal end of the leg portion is fixed; and a first distal portion formed on the opposite side of the first proximal portion, and the second lid member is rotatably connected to the first proximal portion of the first lid member. In this case, the introduction port is covered by the second lid member connected to the first proximal portion of the first lid member.

Preferably, the second lid member includes a second proximal portion connected to the first lid member and a second distal portion formed on the opposite side from the second proximal portion and provided with the second engaging portion. In this case, the second lid member can be fixed to the apparatus body by the second engaging portion formed on the second distal portion.

Preferably, the apparatus body includes an operating unit, and the first lid member covers the operating unit when the first lid member is closed. In this case the operating unit is protected by the first lid member.

The invention is realized in various modes other than those described above and, for example, the invention is realized in the mode of an original document scanning apparatus, a printing apparatus, or a multifunctional peripheral thereof having the sheet type handling apparatus.

BRIEF DESCRIPTION OF THE DRAWINGS

The invention will be described with reference to the accompanying drawings where like numbers reference like elements.

DESCRIPTION OF EXEMPLARY EMBODIMENTS

Referring now to the drawings, a scanner as a mode of a sheet type handling apparatus according to an aspect of the invention on the basis of embodiments will be described.

A. Configuration of Apparatus

Figure 1:
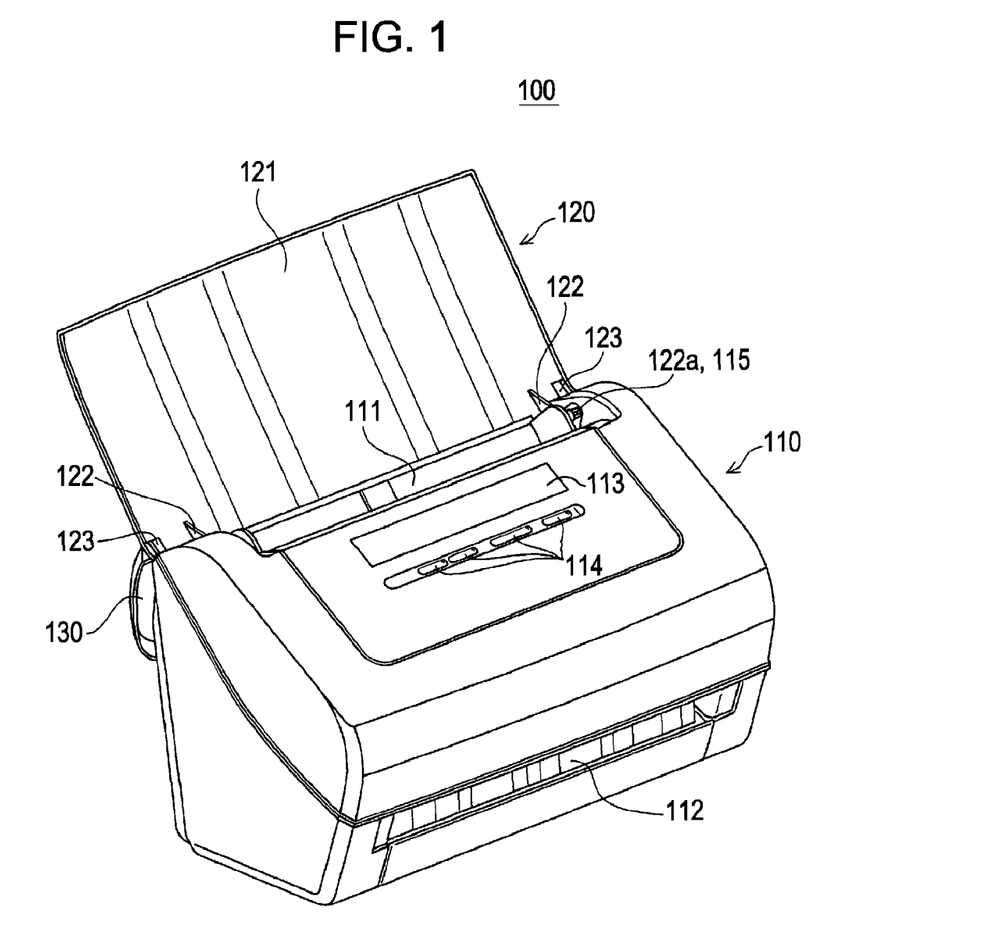
FIG. 1 is an explanatory drawing exemplifying an appearance of a scanner according to an embodiment.

FIG. 1 is an explanatory drawing exemplifying an appearance of a scanner according to an embodiment. A scanner 100 is an image scanning apparatus that scans a scanning object optically and outputs image data. The scanner 100 in this embodiment is so called a sheet-feed type scanner. The scanner 100 includes a case 110, a front lid panel 120, and a rear lid panel 130. The front lid panel 120 corresponds to a "first lid member" in claims, and the rear lid panel 130 corresponds to a "second lid member" in the claims.

The case 110 has a substantially housing shape, and has various devices descried later stored in the interior thereof. The case 110 includes a paper feeding port 111, a paper discharging port 112, a display panel 113, and operating switches 114. The paper feeding port 111 is arranged on the upper side of the case 110 and an original document for scanning an image is introduced therefrom. The paper discharging port 112 is a port that discharges the original document after having introduced from the paper feeding port 111 and having been scanned an image thereof by the internal device. The display panel 113 is arranged on the top of the case 110, and displays an operating state, a scanning accuracy, a scanning range, and the like of the scanner 100. The operating switches 114 allow entry of the operation or the scanning accuracy of the scanner 100. In this embodiment, the side of the paper discharging port 112 is defined as the front side and the side of the paper feeding port 111 is defined as the rear side of the scanner 100 in the description. The display panel 113 and the operating switches 114 correspond to an "operating unit" in the claims.

Figure 2A:
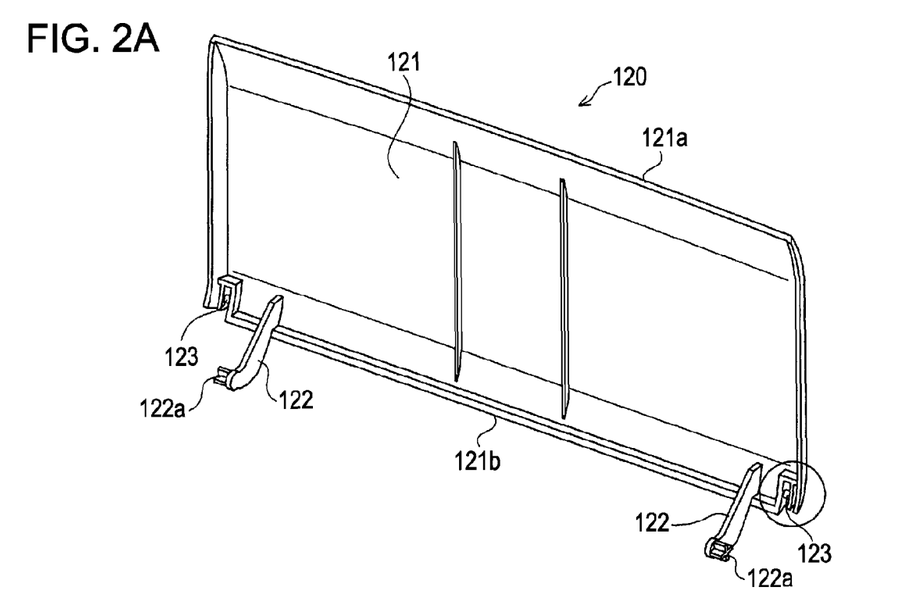
FIGS. 2A and 2B are explanatory drawing exemplifying an appearance of a front lid panel.
Figure 2B:
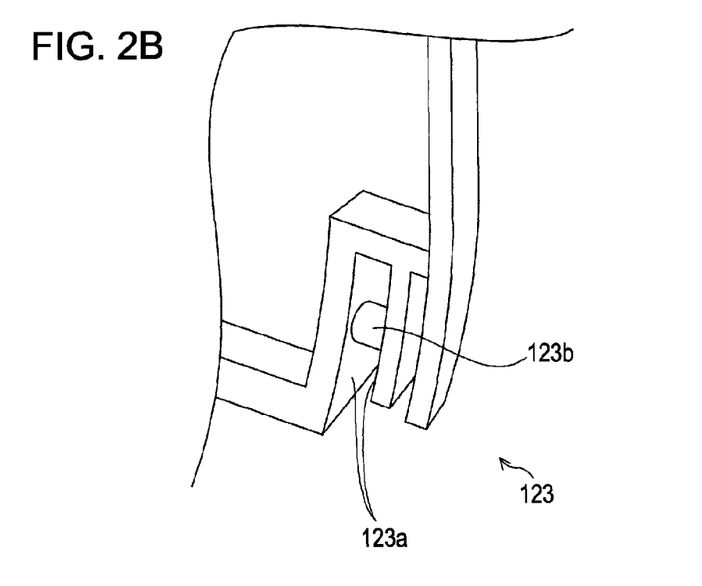

FIGS. 2A and 2B are explanatory drawings exemplifying an appearance of the front lid panel. The side of the front lid panel 120 to be connected to the case 110 is defined as a proximal side (lower side in FIG. 2A) and the opposite side from the proximal side is defined as a distal side (upper side in FIG. 2A) in the description. The front lid panel 120 includes a panel portion 121, leg portions 122, and non-connected portions 123. The panel portion 121 is formed in to a substantially rectangular shape, and includes a distal side 121a on the distal side and a proximal side 121b on the proximal side. The leg portions 122 are arranged at both corner portions on the proximal side 121b, and are each formed with a projecting portion 122a at the distal end thereof. As shown in FIG. 1, the front lid panel 120 is rotatably attached to the case 110 by the projecting portion 122a fitted into recessed portions 115 formed on the upper side of the paper feeding port 111 of the case 110. In the embodiment, the leg portions 122 are arranged at the both corner portions on the proximal side 121b. However, they do not have to be arranged on the proximal side 121b as long as they are positioned near the proximal side 121b.

Since the leg portions 122 are formed to maintain a predetermined distance between the projecting portions 122a and the panel portion 121, the proximal side 121b of the front lid panel 120 comes into contact with the rear side (a contact surface 110a described later) of the paper feeding port 111 when the lid is opened. The front lid panel 120 supports the original document to be introduced into the paper feeding port 111 on the panel portion 121 in a state in which the proximal side 121b is in contact with the rear side of the paper feeding port 111. The original document on the panel portion 121 passes between the leg portions 122 arranged at the both end portions of the proximal side 121b and is introduced into the paper feeding port 111.

As shown in FIG. 2A, the non-connected portions 123 are arranged outsides the leg portions 122 on the proximal side 121b, respectively, so that the connection of the rear lid panel 130 is achieved. As shown in an enlarged drawing in FIG. 2B, the non-connected portion 123 includes end surfaces 123a opposed to each other and formed by removing part of the proximal side 121b in the direction toward the distal end (upward) into a slit shape and a column-shaped engaging portion 123b bridged between the opposed end surfaces 123a. In the embodiment, the non-connected portions 123 are arranged at the both corner portions on the proximal side 121b. However, they do not have to be arranged on the proximal side 121b as long as they are positioned near the proximal side 121b.

Figure 3:
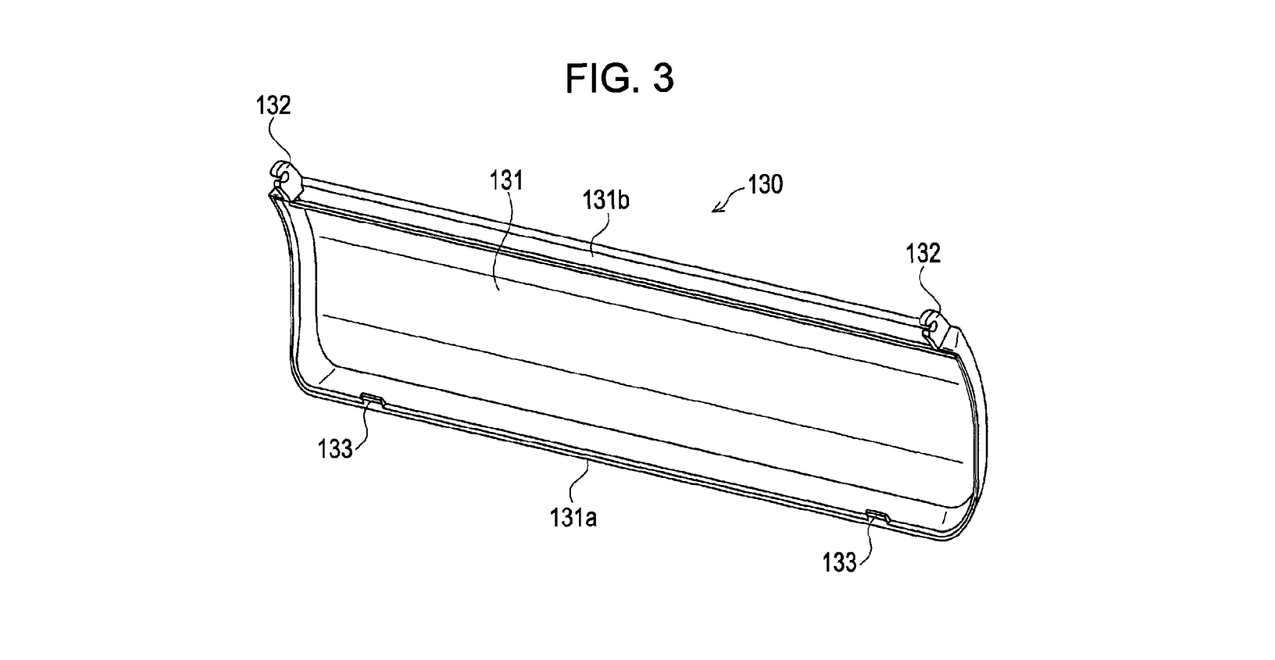
FIG. 3 is an explanatory drawing exemplifying an appearance of a rear lid panel.

FIG. 3 is an explanatory drawing exemplifying an appearance of the rear lid panel. The side of the rear lid panel 130 to be connected to the front lid panel 120 is defined as a proximal side (upper side in FIG. 3), and the opposite side from the proximal side is defined as a distal side (lower side in FIG. 3) in the description. The rear lid panel 130 includes a panel portion 131, connected portions 132, and engaging portions 133. The panel portion 131 is formed into a substantially rectangular shape, and is formed so as to follow the shape of an upper portion of the paper feeding port 111, described later. The panel portion 131 includes a distal side 131a on the distal side and a proximal side 131b on the proximal side. The connected portions 132 are formed into a hook shape, and are arranged respectively at both corner portions of the proximal side 131b of the rear lid panel 130. The rear lid panel 130 is rotatably connected to the front lid panel 120 by the hooks of the connected portions 132 engaged with the engaging portions 123b of the non-connected portions 123. The engaging portions 133 are formed into a protruding shape, and are arranged respectively at the both corner portions of the distal side 131a of the rear lid panel 130. The engaging portions 133 engage engaged portions 116 arranged on the case 110, described later. The engaging portions 133 correspond to "second engaging portions" in the claims. The connected portions 132 and the engaging portions 133 do not have to be arranged on the side as long as they are positioned near the proximal side 131b and the distal side 131a.

B. Mode when Lid is Closed

Figure 4:
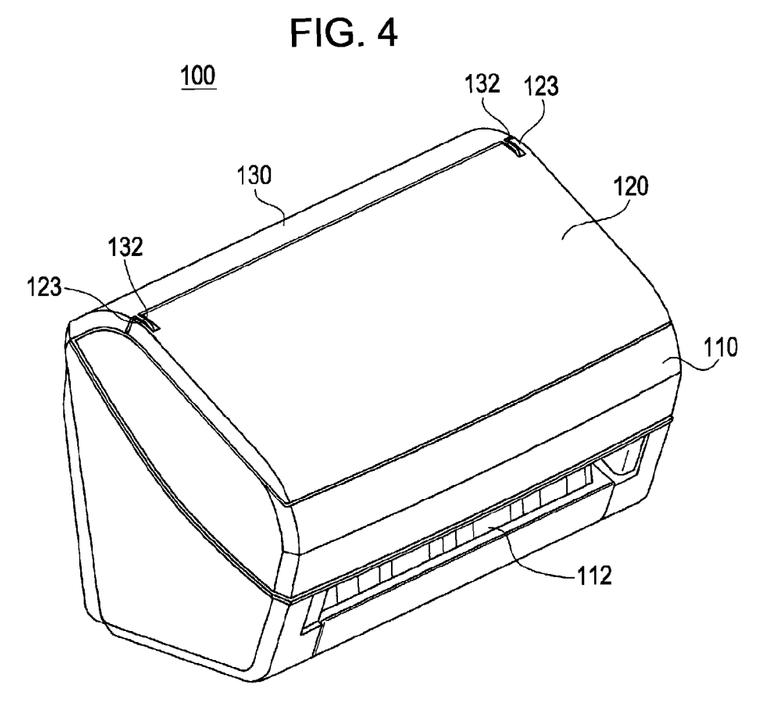
FIG. 4 is an explanatory drawing exemplifying an appearance of the scanner in a state in which a lid is closed.
Figure 5:
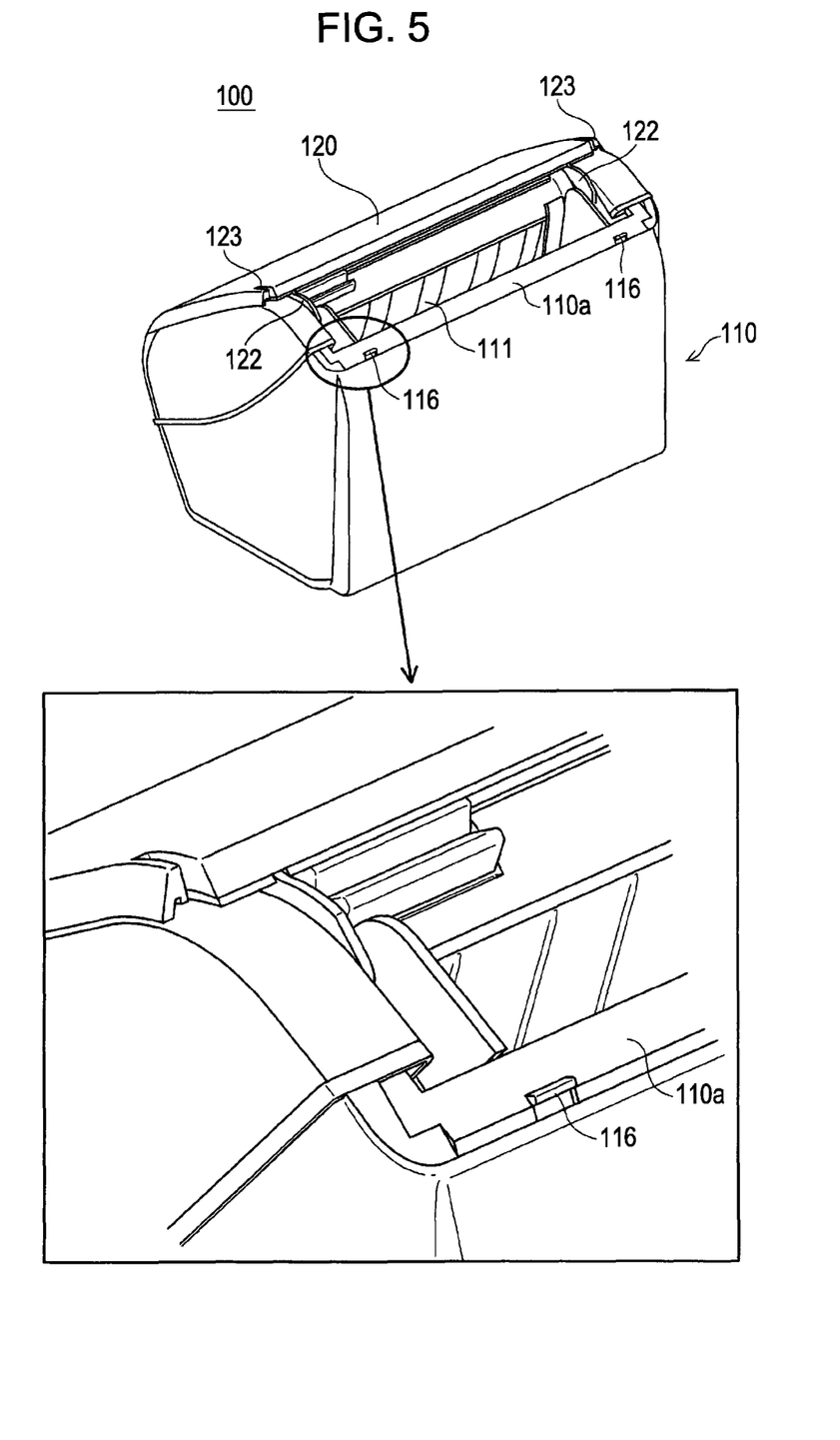
FIG. 5 is an explanatory drawing of a rear side of the scanner.

FIG. 4 is an explanatory drawing exemplifying an appearance of the scanner in a state in which the lid is closed. FIG. 5 is an explanatory drawing of a rear side of the scanner. In FIG. 5, the rear lid panel 130 is not shown for the convenience of explanation. As shown in FIG. 4, when the lid is closed, the front lid panel 120 covers the display panel 113 and the operating switches 114 by the panel portion 121 with the distal side located on the front side of the scanner 100 and the proximal side located on the rear side of the scanner 100. The rear lid panel 130 is arranged on the rear side of the front lid panel 120, and is arranged with the proximal side 131b abutted against the proximal side 121b of the front lid panel 120. The rear lid panel 130 covers the paper feeding port 111 when the lid is closed.

As shown in FIG. 5, the case 110 includes the contact surface 110a on the rear side of the paper feeding port 111, so that the proximal side 121b of the front lid panel 120 comes into contact therewith when the lid is opened. The contact surface 110a includes a pair of the projecting engaged portions 116. The engaged portions 116 engage the engaging portions 133 of the rear lid panel 130 when the lid is closed. The rear lid panel 130 is limited in its rotation on the distal side thereof by the engagement between the engaging portions 133 and the engaged portions 116. Therefore, the rear lid panel 130 is brought into a state of being fixed to the case 110 when the front lid panel 120 is closed. The engaged portions 116 correspond to "first engaging portions" in the claims.

C. Action of Lid Panel

Figure 6:
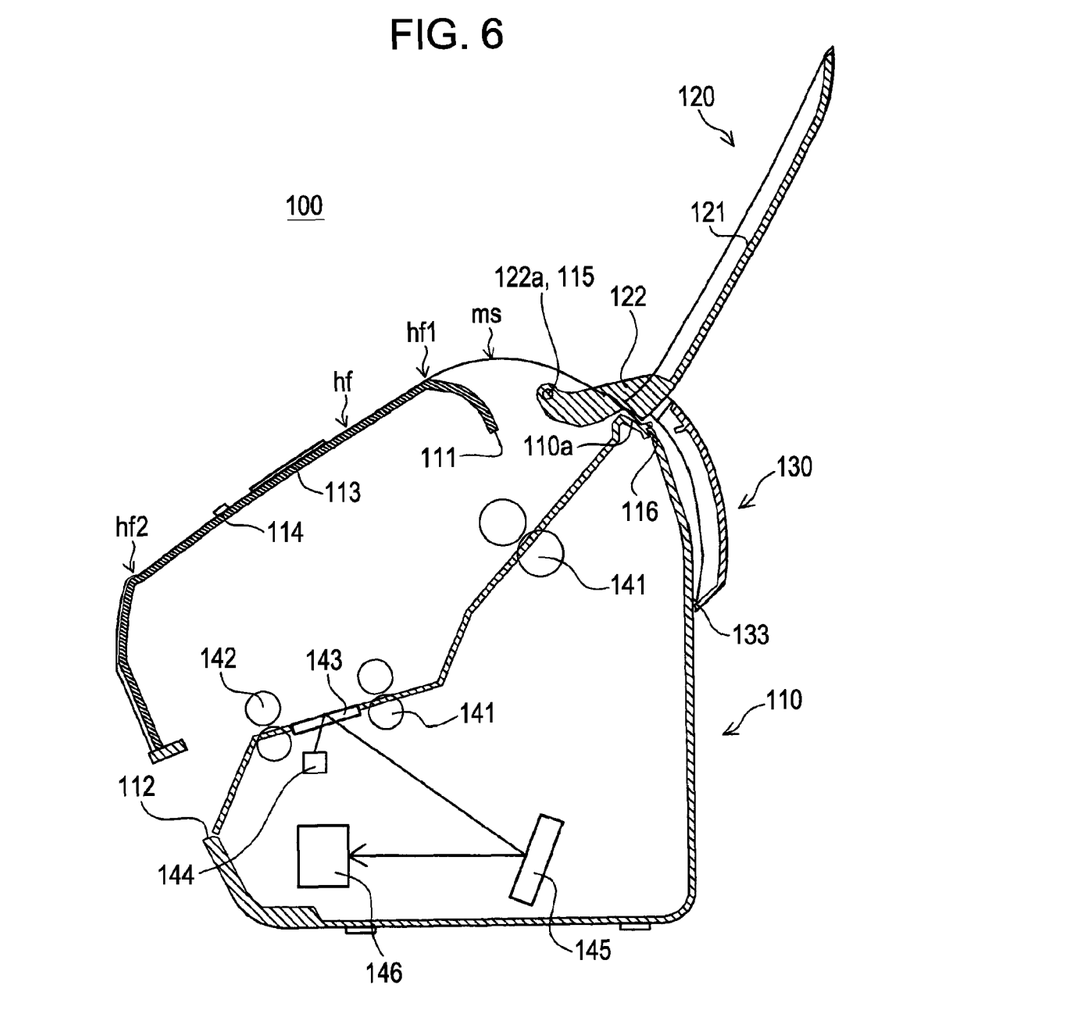
FIG. 6 is an explanatory drawing exemplifying a cross section of the scanner when the lid is opened.
Figure 7:
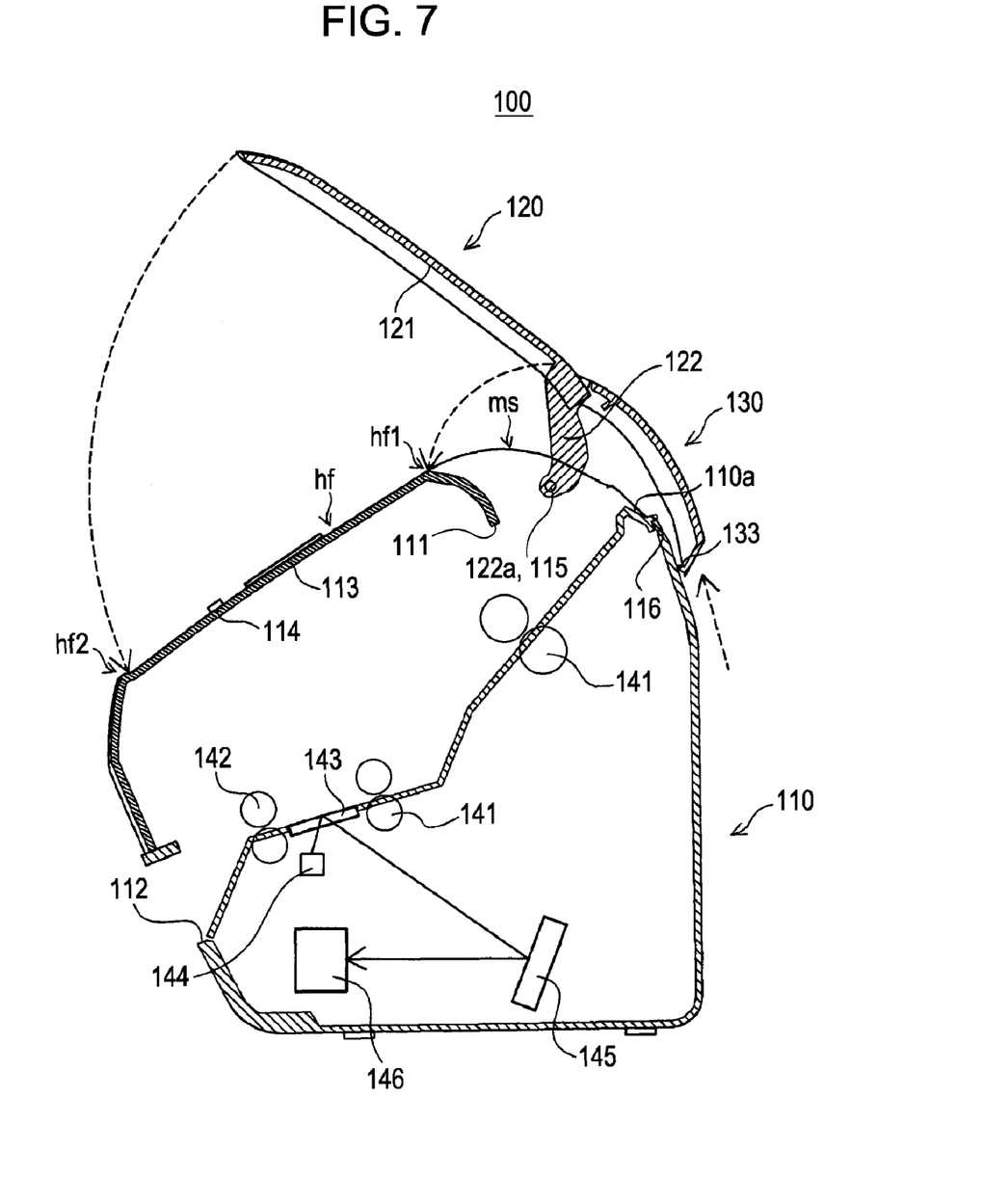
FIG. 7 is an explanatory drawing exemplifying a cross section of the scanner during an action to close the lid.
Figure 8:
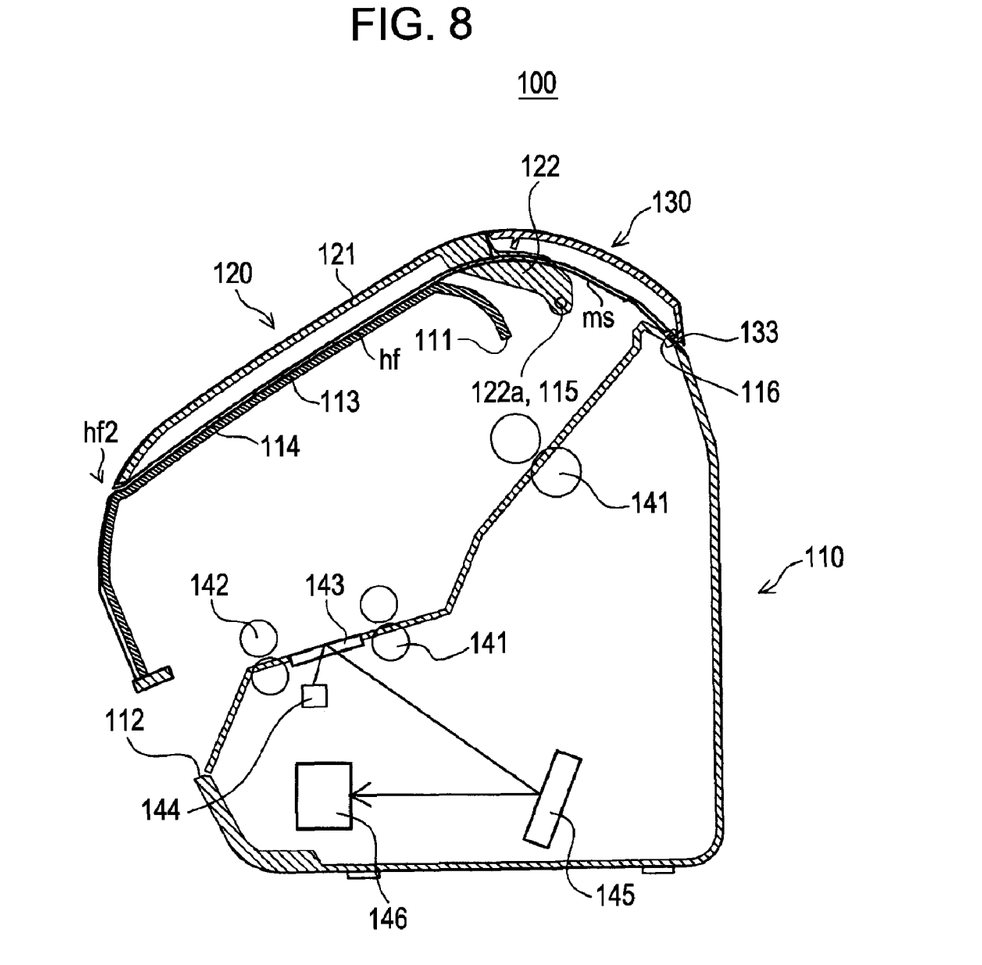
FIG. 8 is an explanatory drawing exemplifying a cross section of the scanner when the lid is closed.

FIG. 6 is an explanatory drawing exemplifying a cross section of the scanner when the lid is opened. FIG. 7 is an explanatory drawing exemplifying a cross section of the scanner during an action to close the lid. FIG. 8 is an explanatory drawing exemplifying a cross section of the scanner when the lid is closed. The case 110 includes a flat operating surface hf where the display panel 113 and the operating switches 114 are arranged. Also, the paper feeding port 111 has an angled curved shape ms on top thereof.

As shown in FIG. 6, when the lid is opened, the proximal side 121b of the front lid panel 120 is in contact with the contact surface 110a. The distal side 131a of the rear lid panel 130 is in contact with the rear side of the case 110 on the rear side of the paper feeding port 111 with the proximal side thereof upside and the distal side thereof being suspended.

The scanner 100 assumes a state in which the lid is closed as shown in FIG. 8 by performing the action to close the lid from the state in which the lid is opened as shown in FIG. 6. The closing operation is performed by inclining the panel portion 121 toward the front side of the scanner 100 about the projecting portions 122a as an axis of rotation as shown in FIG. 7. At this time, since the distance from an end edge hf1 on the rear side of the operating surface hf to the recessed portions 115 is roughly equal to the distance from the recessed portion 115 to the contact surface 110a, the rear end side of the front lid panel 120 straddles the paper feeding port 111 and moves toward the end edge hf1 of the operating surface hf so as to draw an arc in association with the action to tilt the front lid panel 120 to the front side of the scanner 100. The distal side of the front lid panel 120 is moved toward an end edge hf2 on the front side of the operating surface hf so as to draw an arc. The rear lid panel 130 connected at the proximal side to the front lid panel 120 is pulled by the front lid panel 120 in association with the action to close the lid, and the panel portion 131 is moved onto the paper feeding port 111, and then the distal side 131a is moved upward so as to slide on the rear side of the case 110.

When the distal side of the panel portion 121 comes into contact with the end edge hf2, the state in which the lid is closed as shown in FIG. 8 is achieved. At this time, the cross sections of the front lid panel 120 and the rear lid panel 130 are in substantially parallel with the operating surface hf and the curved shape ms on top of the paper feeding port 111. In the distal side of the rear lid panel 130, the engaging portions 133 come into contact with the engaged portions 116, and the rear lid panel 130 is fixed to the case 110.

D. Action of Apparatus

Preferring now to FIG. 6, an action of the apparatus will be described. The scanner 100 includes a paper feeding roller 141, a paper discharging roller 142, a translucent panel 143, a light source 144, a reflecting panel 145, and a photoelectric converter 146 in the interior of the case 110. The scanner 100 transports the original document placed on the panel portion 121 onto the translucent panel 143 from the paper feeding port 111 by the paper feeding roller 141. When the original document is transported onto the translucent panel 143, the light source 144 irradiates the surface of the original document with light via the translucent panel 143. With this irradiation, the light reflected from the original document is reflected by the reflecting panel 145 and forms an image by the photoelectric converter 146, so that image data of the surface of the original document is scanned. The scanning of the original document is taken on the line-to-line basis, and every time when the scanning is completed, the scanned original document is transported toward the paper discharging port 112 by the paper discharging roller 142.

According to the sheet type handling apparatus in the embodiment described above, since the paper feeding port 111 is covered by the rear lid panel 130 when the lid is closed, the limitation on the shape of the scanner 100 is alleviated. Specifically, since the paper feeding port 111 is not covered by the front lid panel 120 having a flat shape, but the paper feeding port 111 is covered by the rear lid panel 130, it is not necessary to make the paper feeding port 111 flat, so that the limitation on the shape of the scanner 100 is alleviated.

According to the sheet type handling apparatus in the embodiment, since the upper surface of the scanner 100 is covered by the two lid members of the front lid panel 120 and the rear lid panel 130, the limitation on the shape of the scanner 100 is alleviated. Specifically, even when the flat portion and the angular curved portion exist on the upper portion of the case 110, the front lid panel 120 having the function as a tray covers the flat portion, and the rear lid panel 130 covers the portion having the curved portion, so that the flexibility in design of the case 110 is improved.

According to the sheet type handling apparatus in the embodiment, since the front lid panel 120 covers the display panel 113 and the operating switches 114 and the rear lid panel 130 covers the paper feeding port 111 when the lid is closed, these portions are protected. Also, operation of the operating unit and insertion of the original document or the like into the paper feeding port are prevented when the scanner 100 is not in use, so that failure or the like of the apparatus is restrained.

According to the sheet type handling apparatus in the embodiment, the case 110 and the front lid panel 120 are provided with the engaging portions respectively, and the front lid panel 120 is fixed to the case 110 by the engagement thereof when the lid is closed. Accordingly, the insertion of the original document into the paper feeding port 111 by rotating the front lid panel 120 is restrained when the lid is closed.

According to the sheet type handling apparatus in the embodiment, the front lid panel 120 is provided with the leg portions 122, and the rear lid panel 130 is connected to the proximal side 121b of the front lid panel 120, so that the engagement of the engaging portions 133 of the rear lid panel 130 with the engaged portions 116 of the case 110 is achieved by the action to close the front lid panel 120. Specifically, since the proximal side of the front lid panel 120 is provided with the leg portions 122, it moves so as to draw an arc in association with the action to close the lid. Accordingly, the distal side 131a of the rear lid panel 130 which is connected at the proximal side 131b to the proximal side 121b is moved upward so as to slide on the rear side of the case 110, the engagement between the engaging portions 133 and the engaged portions 116 is achieved.

According to the sheet type handling apparatus in the embodiment, since the front lid panel 120 is provided with the leg portions 122, it does not cover the paper feeding port 111 having the shape of the curved surface when the lid is closed, but is able to cover the flat surface, and since the rear lid panel 130 is connected to the rear end side of the panel portion 121, it is able to cover the paper feeding port 111.

E. Modification

In the embodiment, the top of the paper feeding port 111 is formed into the angular curved shape. However, it may be of other shape as long as the rear lid panel 130 is able to cover when the lid is closed.

In the embodiment, the paper feed tray is used as the front lid panel 120. However, even when the paper feed tray does not function as a lid member of the scanner 100, the scanner 100 in which the rear lid panel 130 is connected to the paper feed tray and the rear lid panel 130 covers the paper feeding port 111 when the paper feed tray is stored may be realized.

In the embodiment, since the scanner 100 is provided with the display panel 113 and the operating switches 114, the scanner 100 may be provided with part of these members or may not be provided these members.

In the embodiment, although the front lid panel 120 covers the display panel 113 and the operating switches 114 when the lid is closed, it may cover members other than these members, or may cover nothing.

In the embodiment, the leg portions 122, the non-connected portions 123, the engaging portions 133, and the engaged portions 116 are arranged near the both ends of the apparatus in pairs respectively, they may not be provided in pairs.

Although the scanner 100 in the embodiment is a scanner specific machine, the invention is not limited thereto, and may be applied to original document scanning apparatuses such as a scanner or a facsimile machine, printing apparatus such as a printer or a copying machine, or multifunction peripherals including these apparatuses as long as it is the apparatus provided with the paper feed tray.

Although the invention has been described on the basis of the embodiment and modifications thereof, the embodiment of the invention described above is described for better understanding of the invention, and is not intended to limit the invention. The invention may be modified and improved without departing the purport and the scope of the claims, and the invention includes their equivalents.

What is claimed is:

1. A sheet handling apparatus which handles various sheets comprising:
   an apparatus body having an introduction port for introducing the sheets;
   a first lid member rotatably attached to the apparatus body for supporting the sheets introduced into the introduction port; and
   a second lid member connected to the first lid member for covering the introduction port in association with an action to close the first lid member and to expose the introduction port in association with an action to open the first lid member,
   wherein the apparatus body includes first engaging portions,
   wherein the second lid member includes second engaging portions which engage the first engaging portions when the first lid member is closed so as to be fixed to the apparatus body when the first lid member is closed,
   wherein the first lid member includes leg portions attached at distal ends thereof to the apparatus body; a first proximal portion to which proximal ends of the leg portions are fixed; and a first distal portion formed on the opposite side of the first proximal portion, and
   wherein the first engaging portions are formed in the distal ends of the first proximal portion of the first lid member with the leg portions being formed between the first engaging portions, and
   wherein the second lid member is rotatably connected to the first proximal portion of the first lid member in an area.

2. The sheet handling apparatus according to claim 1,
   wherein the second lid member includes a second proximal portion connected to the first lid member and a second distal portion formed on the opposite side from the second proximal portion and provided with the second engaging portions.

3. The sheet handling apparatus according to claim 1,
   wherein the apparatus body includes an operating unit, and the first lid member covers the operating unit when the first lid member is closed.

4. An original document scanning apparatus comprising the sheet handling apparatus according to claim 1.

5. A printing apparatus comprising the sheet handling apparatus according to claim 1.

* * * * *